United States Patent Office 3,222,387
Patented Dec. 7, 1965

---

3,222,387
1,3,4 - TRIMETHYLCYCLOHEX - 3 - ENE - CARBOXYLIC ACID - (1) - BETA - ISOCYANATOETHYL ESTER
Hanswilli von Brachel, Cologne-Sulz, and Otto Bayer, Leverkusen, Germany, assignors to Farbenfabriken Bayer Aktiengesellschaft, Leverkusen, Germany, a German corporation
No Drawing. Filed Jan. 24, 1962, Ser. No. 168,499
Claims priority, application Germany, Jan. 25, 1961, F 33,052
1 Claim. (Cl. 260—453)

This invention relates to Diels-Alder adducts and more particularly, to Diels-Alder adducts of unsaturated isocyanates.

It has been proposed heretofore to prepare copolymers of unsaturated isocyanates which are high polymeric solid compounds. Such a process is proposed in U.S. Patent 2,326,287 which shows, for example, the polymerization of vinyl isocyanates with methyl methacrylate to prepare a translucent thermoplastic resin. Previous attempts to prepare monomeric products have not been successful. Indeed, the isocyanate group is so reactive that such addition to conjugated dienes was considered impossible. It is known, for example, that phenyl isocyanates by analogy with maleic anhydride enter into a spontaneous reaction with isoindoles where the isocyanate group itself behaves as the philodiene member. Even mild catalysis of the reaction will produce a highly polymeric substance.

It is therefore an object of this invention to provide for the production of monomeric Diels-Alder adducts containing free isocyanate groups. Another object of this invention is to provide for the production of Diels-Alder adducts of aliphatically unsaturated isocyanates and conjugated dienes. Still a further object of this invention is to provide a process for the preparation of monomeric isocyanates from aliphatically unsaturated isocyanates and aliphatically unsaturated conjugated dienes. A further object of this invention is to provide a method of preparing monomeric isocyanates from unsaturated compounds which avoids the preparation of high polymers.

The foregoing objects and others which will become apparent from the following description are accomplished in accordance with the invention, generally speaking, by providing compounds including those having the formula

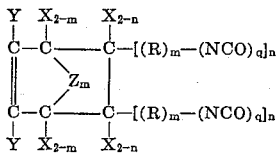

wherein X and Y are hydrogen, halogen or an organic radical, $m$ is 0 or 1, $n$ is 0, 1 or 2, R is a simple bond or polyvalent organic radical, Z is $CX_2$, $-CX_2-CX_2-$ or oxygen, $q$ is 1 or 2, at least one $-R-(NCO)_q$ group being present in the molecule, said compound having a molecular weight below about 500. When X and Y in the foregoing formula are an organic radical, it may be any organic radical which will not increase the molecular weight of the monomeric compound beyond the maximum molecular weight of 500 such as, alkyl for example, methyl, ethyl, propyl, butyl and the like up to and including dodecyl, cycloaliphatic, such as cycloalkyl, such as cyclohexyl and including unsaturated aliphatic hydrocarbon residues as well as aryl radicals such as phenyl, tolyl and the like. Of course, the organic radicals which may be X or Y in the foregoing formula may be substituted with halogen, nitro groups and the like and they may contain other atoms besides carbon and hydrogen such as, for example, nitrogen, oxygen, sulfur and the like as are found in ether groups, ester groups, urethane groups, urea groups, thioether groups and the like. If X and Y are halogen, it may be chlorine, bromine, iodine, fluorine and the like. The difference between the radicals X and Y is that the radical Y may be closed to form a five- or six-membered ring as it is the case when 1,2-dimethylene cyclohexane is the diene starting material. In the case of $m$ being 0 the bridge between the two middle carbon atoms of the ring is absent. In the case of R being just a simple bond the NCO group is attached directly to the carbon atom of the ring as it is the case when vinylisocyanate is used as philodiene starting material. The polyvalent organic radical represented by R in the foregoing formula may be any suitable organic radical such as, for example, alkylene radicals, arylene radicals and the like. The two radicals R may be closed to a cycloaliphatic ring as it is the case when, for instance, cyclohexene-4-yl-1-isocyanate is the philodiene starting material. The radical R too may contain other groupings such as those set forth above especially ester or urethane groups and the like. Suitable alkylene radicals are, for example, methylene, ethylene, propylene, butylene, cyclohexylene and the like; suitable arylene radicals are, for example, phenylene, tolylene, xylene and the like. It is preferred but not necessary that the polyvalent organic radical be bonded to an —NCO group through an aliphatic carbon atom. The nature of the organic radicals will be more thoroughly understood from the examples of isocyanates and conjugated dienes set forth below as raw materials for the preparation of the compounds of the invention.

The invention also contemplates a process for the preparation of the Diels-Alder adducts represented, inter alia, by the formula set forth above which comprises reacting an aliphatically unsaturated isocyanate with an aliphatically unsaturated conjugated diene which is free from active hydrogen containing groups as determined by the Zerewitinoff method under conditions which avoid the production of high polymers. The reaction between the aliphatically unsaturated isocyanate and the aliphatically unsaturated conjugated diene takes place readily by simply heating the reactants under conditions which avoid polymerization and preferably in the presence of a polymerization inhibitor such as a sterically hindered phenol. Indeed, the production of compounds having the formula set forth above depends on the absence of conditions which will cause the preparation of high polymers.

Any suitable unsaturated isocyanate may be used such as, for example, vinyl isocyanate, allyl isocyanate, but-1-en-4-yl isocyanate, oleyl isocyanate, styryl isocyanate, isocyanatoethyl-beta-acrylate, isocyanatoethyl-beta-methacrylate, isocyanatopropyl-beta-crotonate, cyclohex-4-en-1-yl isocyanate, 2-isocyanato-bicyclo-[2.2.1]-hept-5-ene, 2-isocyanato-bicyclo-[2.2.2]-oct-5-ene, 2 - isocyanato-bicyclo-[2.2.3]-non-5-ene, 4-isocyanato-benzoic acid allyl ester, and the 3-isocyanato-4-methyl-phenyl-urethanes of allyl alcohol, or of 9,10-octadecanol as well as diisocyanates such as 2-butylene-1,4-diisocyanate and its adducts with dienes such as, for example, butadiene, chloroprene and the like, the 2,4-diisocyanato-benzoic acid allyl ester and the beta-isocyanato-ethyl ester of fumaric acid and the like. Instead of using unsaturated compounds which contain free isocyanato groups, it is also possible to use substances which split off isocyanate under the conditions of the diene synthesis such as, for example, the phenyl urethane of 2-butylene-1,4-diisocyanate, the acetoacetic acid ester of 2-butylene-1,4-diisocyanate or the hydrocyanic acid adducts of carbamic acid chlorides of the aforementioned isocyanates and the like.

Any suitable conjugated diene which is free of active hydrogen containing groups as determined by the Zerewitinoff method may be used such as, for example, butadiene, piperylene, isoprene, 2,3-dimethyl butadiene, 1-heptadecyl butadiene, 1-phenyl butadiene, 1-methoxy butadiene, 2-methoxy butadiene, 1-acetoxy butadiene, 2-chloro-1,3-butadiene, cyclopentadiene, cyclohexadi-1,3-ene, 1-methyl-cyclohexadi-2,4-ene, 1,2-dimethylene cyclohexane, 1-vinylcyclohex-1-ene, hexachlorocyclopentadiene, hexabromo-cyclopentadiene, tetrachlorodimethoxycyclopentadiene, pentachloro-n - butyl - cyclopentadiene, and beta - chloroethyl-pentachloro-cyclopentadiene. Isocyanates with activated double bonds can also be reacted with anthracene and furane. Instead of the free dienes, it is also possible to use those compounds which split off dienes under the conditions of the reaction, such as butadiene sulphone or dicyclopentadiene. Furthermore, trienes such as 1,3,6-heptatriene, tetraenes such as 2,4,7,9-undecatetraene and the like, provided they contain at least two conjugated double bonds, are suitable starting materials in accordance with the diene synthesis.

The reaction may be carried out by simply heating the two reactants, preferably in approximately equimolar quantities, to temperatures within the range of from about 50° C. to about 250° C. As set forth above, it is essential to the invention to carry out the reaction under conditions which avoid the formation of high polymers. This can be done by using a polymerization inhibitor such as, for example, polyvalent phenols like hydroquinone or still better tetrabutyl pyrocatechol and sterically hindered phenols including 2,6-ditertiary butyl p-cresol as well as phenoxy propylene oxide and the like. It is often desirable to carry out the reaction in the presence of an inert organic solvent such as, for example, aliphatic hydrocarbons, such as hexane, heptane, octane and the like, aromatic hydrocarbons such as, for example, benzene, toluene, xylene, and the like, halogenated hydrocarbons such as, for example, o-dichlorobenzene, 2,4-dichlorotoluene and the like, ethers such as the diethyl ether of diethylene glycol, the diethyl ether of triethylene glycol and the like, esters such as ethyl proprionate, ethyl acetate and the like. The reaction time and reaction temperature vary according to the compounds used but the reaction is usually complete in less than 24 hours when heated to a temperature within the range set forth above. Moreover, the reaction usually takes at least about one hour in order to obtain any substantial quantity of the monomeric product but reaction times of less than one hour may be used in some cases. The reaction time and temperature correspond to the usual conditions for diene synthesis reactions with olefins provided that the philodiene member does not contain an activating group such as a carbonyl or carboalkoxy group in the vicinity of the double bond. In the latter case, the reaction conditions correspond to the conditions usually employed for alpha-olefin carboxylic acids and alpha-olefin aldehydes.

The isocyanates produced according to this invention may be used for many purposes including the production of plastics, insecticides and the like. The plastics produced from the polyisocyanates of the invention are in turn useful as foam cushions, gear wheels and the like.

The invention is further illustrated by the following examples in which the parts are by weight unless otherwise indicated.

*Example 1*

About 27.3 parts of hexachloro-cyclopentadiene and about 8.3 parts of allyl isocyanate are heated with addition of about 0.5 part of phenoxy propylene oxide in a sealed tube for about 5 hours to about 150° C. The mixture is then allowed to cool and it is fractionated under high vacuum. Yield: about 28 parts of 2-isocyanatomethyl-1,4,5,6,7,7-hexachloro-bicyclo-[2.2.1]-hept-5-ene with the boiling point at 0.1 to 0.2 mm. Hg of 120 to 130° C.; $n_D^{20}$: 1.557.

*Analysis.*—Calculated: C, 30.3%; H, 1.4%; Cl, 60.0%; N, 3.8%; O, 4.5%. Found: C, 30.4%; H, 1.5%; Cl, 59.8%; N, 4.4%; O, 4.5%.

*Example 2*

About 50 parts of dicyclopentadiene, about 15 parts of allyl isocyanate, about 0.3 part of 2,6-ditertiary butyl p-cresol and about 80 parts of absolute benzene are heated for about 10 hours in an autoclave under nitrogen to about 170° C. The benzene is then distilled off and then the excess dicyclopentadiene in the form of its parent monomer. When no more cyclopentadiene distills over, the residue is fractionated in vacuo. Yield: about 21 parts of 2-isocyanato-methyl-bicyclo-[2.2.1]-hept-5 - ene; boiling point at 12 mm. Hg 83° C.; $n_D^{20}$: 1.4881.

*Example 3*

About 26.7 parts of ethyl-pentachloro-cyclopentadiene and about 8.3 parts of allyl isocyanate are heated for about 5 hours with addition of about 0.5 part of phenoxy propylene oxide in a sealed tube to about 150 to about 160° C. By fractional distillation, there are obtained about 24 parts of 2-isocyanato-methyl - 1,4,5,6,7 - pentachloro-7-ethyl bicyclo-[2.2.1]-hept-5-ene with the boiling point at 0.2 mm. Hg of 120° C.

*Analysis.*—Calculated: C, 37.8%; H, 2.9%; Cl, 50.8%; N, 4.0%. Found: C, 37.9%; H, 3.1%; Cl, 49.8%; N, 4.2%.

*Example 4*

About 15.5 parts of isocyanatoethyl-beta-methacrylate, about 10 parts of 2,3-dimethyl butadiene and about 1 part of 2,6-ditertiary butyl p-cresol are heated under nitrogen in a sealed tube for about 10 hours to 130° C. Yield: about 23 parts of 1,3,4-trimethylcyclohex-3-en-carboxylic acid-(1)-beta-isocyanatoethyl ester. Boiling point at 0.01 to 0.05 mm. Hg is 80 to 85° C.; $n_D^{20}$: 1.4780.

While certain unsaturated isocyanate conjugated dienes, polymerization inhibitors and the like are used in the preceding working examples, it is to be understood that any other suitable compounds could have been used if the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claim.

What is claimed is:

The compound 1,3,4-trimethylcyclohex-3-ene-carboxylic acid-(1)-beta-isocyanatoethyl ester.

References Cited by the Examiner

UNITED STATES PATENTS

| | | | |
|---|---|---|---|
| 2,758,918 | 8/1956 | Soloway et al. | 260—453 |
| 3,069,468 | 12/1962 | Cox et al. | 260—453 |
| 3,151,143 | 9/1964 | Hoch | 260—453 |

OTHER REFERENCES

Royals Advanced Organic Chemistry, page 407 (1954).

CHARLES B. PARKER, *Primary Examiner.*

IRVING MARCUS, *Examiner.*